(12) United States Patent
Oishi et al.

(10) Patent No.: US 11,467,097 B2
(45) Date of Patent: Oct. 11, 2022

(54) ROAD MANAGEMENT DEVICE

(71) Applicant: HONDA MOTOR CO., LTD., Tokyo (JP)

(72) Inventors: Yasuo Oishi, Tokyo (JP); Kazuya Matsuura, Tokyo (JP); Akira Iihoshi, Tokyo (JP); Takeo Tokunaga, Tokyo (JP); Atsuki Kakinuma, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 16/832,418

(22) Filed: Mar. 27, 2020

(65) Prior Publication Data
US 2020/0309713 A1    Oct. 1, 2020

(30) Foreign Application Priority Data

Mar. 29, 2019  (JP) .............................. JP2019-068237

(51) Int. Cl.
| | | |
|---|---|---|
| *G01N 21/88* | (2006.01) | |
| *G01N 21/95* | (2006.01) | |
| *B60R 11/00* | (2006.01) | |
| *B60R 11/04* | (2006.01) | |

(52) U.S. Cl.
CPC ......... *G01N 21/8851* (2013.01); *G01N 21/95* (2013.01); *B60R 11/04* (2013.01); *B60R 2011/004* (2013.01); *G01N 2201/0216* (2013.01)

(58) Field of Classification Search
CPC ..... G01N 21/95; G01N 21/8851; E01C 23/01
See application file for complete search history.

(56) References Cited

U.S. PATENT DOCUMENTS

| | | | |
|---|---|---|---|
| 9,801,000 B2 | 10/2017 | Shao | |
| 10,048,688 B2 | 8/2018 | Ramasamy | |
| 2009/0140887 A1* | 6/2009 | Breed | G01S 17/86 |
| | | | 701/116 |
| 2012/0296683 A1* | 11/2012 | Groeneweg | G06Q 10/06 |
| | | | 705/7.13 |

(Continued)

FOREIGN PATENT DOCUMENTS

| | | |
|---|---|---|
| CN | 103309315 A | 9/2015 |
| CN | 109313032 A | 2/2019 |

(Continued)

OTHER PUBLICATIONS

Office Action dated Feb. 2, 2021 issued over the corresponding Japanese Patent Application No. 2019-068237 with the English translation thereof.

(Continued)

*Primary Examiner* — Neil R Mikeska
(74) *Attorney, Agent, or Firm* — Carrier Blackman & Associates, P.C.; Joseph P. Carrier; Jeffrey T. Gedeon

(57) ABSTRACT

A road management device comprises an arithmetic section that performs a certain analysis on a road using information acquired by a moving body (a vehicle) moving along the road. The arithmetic section performs the certain analysis on the road in a first time slot using first information acquired by a first moving body of a first kind, and performs the certain analysis on the road in a second time slot using second information acquired by a second moving body of a second kind.

5 Claims, 8 Drawing Sheets

(56) References Cited

U.S. PATENT DOCUMENTS

| | | | |
|---|---|---|---|
| 2016/0086393 A1* | 3/2016 | Collins | A61B 5/024 |
| | | | 701/31.5 |
| 2016/0364921 A1* | 12/2016 | Iyoda | H04L 67/42 |
| 2017/0225567 A1 | 8/2017 | Tsuda | |
| 2018/0129980 A1* | 5/2018 | Rennie | G06Q 50/10 |
| 2018/0233047 A1* | 8/2018 | Mandeville-Clarke | |
| | | | B62D 15/0255 |
| 2019/0271550 A1* | 9/2019 | Breed | F21S 41/13 |
| 2019/0342859 A1* | 11/2019 | Rubin | G08G 1/052 |

FOREIGN PATENT DOCUMENTS

| | | |
|---|---|---|
| JP | 6239144 B2 | 11/2017 |
| JP | 2018-021375 A | 2/2018 |
| JP | 2019-504316 A | 2/2019 |
| WO | 2018/080798 A1 | 5/2018 |

OTHER PUBLICATIONS

Office Action dated Feb. 24, 2021 issued over the corresponding Indian Patent Application No. 202044013641 with the English translation thereof.

Office Action including search report dated Mar. 4, 2022 issued over the corresponding Chinese Patent Application No. 202010230770.0 with the English translation thereof.

* cited by examiner

FIG. 2

| Narrow Road (Width < Threshold) (Median Strip Absent) (Maximum Speed = First Speed) | Wide Road (Width ≧ Threshold) (Median Strip Present) (Maximum Speed = Second Speed) |
|---|---|
| Two-Wheeled Vehicle | Four or More-Wheeled Vehicle |

| Daytime (7:00 TO 19:00) | Nighttime (19:00 TO 7:00) |
|---|---|
| Private Vehicle | Commercial Vehicle |

| | Narrow Road (Width < Threshold) (Median Strip Absent) (Maximum Speed = First Speed) | Wide Road (Width ≥ Threshold) (Median Strip Present) (Maximum Speed = Second Speed) |
|---|---|---|
| Daytime (7:00 TO 19:00) | Bicycle | Private Vehicle |
| Nighttime (19:00 TO 7:00) | Motorcycle | Commercial Vehicle |

66

ROAD MANAGEMENT DEVICE

CROSS-REFERENCE TO RELATED APPLICATION

This application is based upon and claims the benefit of priority from Japanese Patent Application No. 2019-068237 filed on Mar. 29, 2019, the contents of which are incorporated herein by reference.

BACKGROUND OF THE INVENTION

Field of the Invention

The present invention relates to a road management device that performs a certain analysis on a road based on information acquired by a moving body moving along the road.

Description of the Related Art

Japanese Laid-Open Patent Publication No. 2018-021375 discloses a device that images a road by a camera installed in a vehicle, and analyzes a crack of the road, and so on, based on that image.

SUMMARY OF THE INVENTION

The device of Japanese Laid-Open Patent Publication No. 2018-021375 collects an image by running a dedicated vehicle that images a road surface. In the case of this device, in order for information of a wide road surface to be collected, the vehicle must be run in each of regions, which is time-consuming. In contrast to this device, it is conceivable to collect an image from an ordinary vehicle that images the road surface by a drive recorder, or the like, while running along the road, and analyze that image.

However, there is a risk that if an image or a sensor value of the vehicle is collected unrestrictedly from the ordinary vehicle, then an information amount becomes enormous, and processing and recording of the information is hindered. It is therefore desirable for the information to be collected with careful selection.

The present invention was made considering such a problem, and has an object of providing a road management device that can appropriately select information to be used when performing analysis of a road based on information acquired by a camera or a sensor installed in a vehicle.

An aspect of the present invention is a road management device comprising an arithmetic section, the arithmetic section performing a certain analysis on a road using information acquired by a moving body moving along the road, the arithmetic section performing the certain analysis on the road in a first time slot using first information acquired by a first moving body of a first kind, and performing the certain analysis on the road in a second time slot using second information acquired by a second moving body of a second kind.

Due to the present invention, information to be used in analysis of a road can be appropriately selected.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 2 is a schematic view of a first table;
FIG. 3 is a schematic view of a second table;
FIG. 4 is a schematic view of a third table.

DESCRIPTION OF THE PREFERRED EMBODIMENTS

Preferred embodiments of a road management device according to the present invention will be presented and described in detail below with reference to the accompanying drawings.

1. First Embodiment

1.1. Configuration

Figure 1:
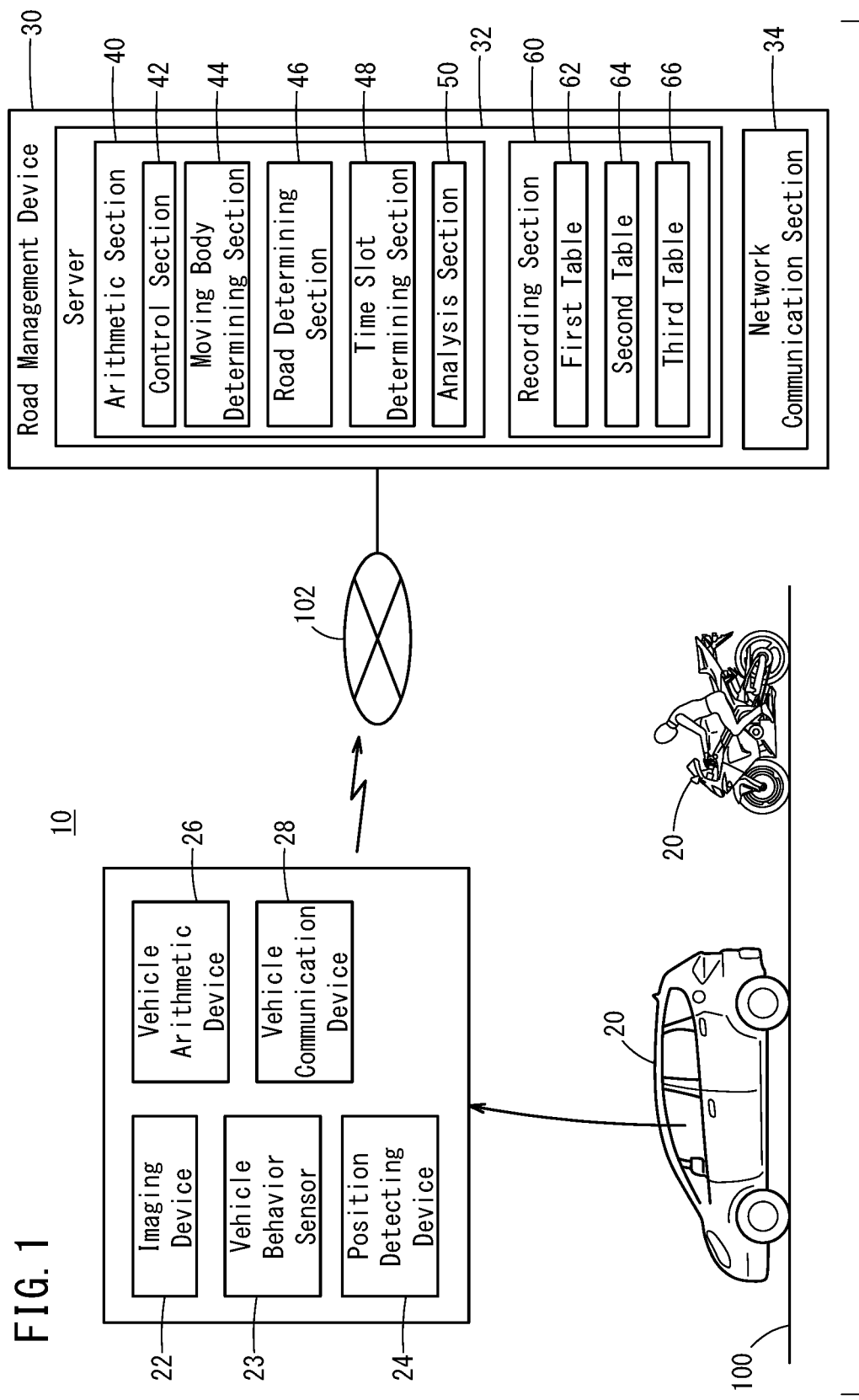
FIG. 1 is a configuration diagram of a road management system according to a first embodiment.

A configuration of a road management system 10 according to a first embodiment will be described using FIG. 1. The road management system 10 includes: a vehicle 20 (a moving body) that performs communication via a public line 102; and a road management device 30.

[1.1.1. Vehicle 20]

In the present specification, the vehicle 20 includes both a vehicle 20 having a motor, and a vehicle 20 not having a motor. The vehicle 20 includes an imaging device 22, a vehicle behavior sensor 23, a position detecting device 24, a vehicle arithmetic device 26, and a vehicle communication device 28. Note that in the case of the vehicle 20 not having a motor, these configurations are realized by a terminal device (a smartphone, or the like) carried by a user of the vehicle 20. The terminal device is preinstalled with dedicated application software for realizing these functions.

The imaging device 22 is a camera, and images a periphery of the vehicle 20. The imaging device 22 outputs image information to the vehicle arithmetic device 26. The vehicle behavior sensor 23 is a wheel speed sensor or inclination sensor and so on, for example, and detects behavior information of the vehicle 20 to be used in analysis of a road 100. The vehicle behavior sensor 23 outputs detected information to the vehicle arithmetic device 26. The position detecting device 24 is a navigation device, for example, and detects a position of the vehicle 20. The position detecting device 24 outputs position information indicating the detected position to the vehicle arithmetic device 26. Moreover, the position detecting device 24 specifies road information of the detected position based on map information, and outputs the road information to the vehicle arithmetic device 26. The road information includes information such as road width, presence/absence of a median strip, maximum speed (speed limit), and so on. The vehicle arithmetic device 26 includes an input/output device, a processor, and various kinds of memories. The vehicle arithmetic device 26 associates: the image information; the position information and the road information of a position where an image has been imaged; time information indicating a system time when the image has been imaged; and prerecorded vehicle information, and outputs these to the vehicle communication device 28. The vehicle information includes information of a kind of the vehicle 20 (a two-wheeled vehicle 20, a four or more-wheeled vehicle 20, a private vehicle, a commercial vehicle).

The vehicle communication device 28 transmits to the road management device 30 via the public line 102 information outputted from the vehicle arithmetic device 26, and, moreover, receives information transmitted from the road management device 30, and outputs the received information to the vehicle arithmetic device 26.

[1.1.2. Road Management Device 30]

The road management device 30 includes a server 32 and a network communication section 34. The server 32 is a computer, and includes an arithmetic section 40 and a recording section 60.

The arithmetic section 40 is configured by a processor comprising the CPU and so on. The arithmetic section 40 realizes various kinds of functions by executing a program recorded in the recording section 60. The arithmetic section 40 functions here as a control section 42, a moving body determining section 44, a road determining section 46, a time slot determining section 48, and an analysis section 50.

The control section 42 controls processing of the arithmetic section 40 in an integrated manner. The moving body determining section 44 determines the kind of the vehicle 20, based on the vehicle information acquired from the vehicle 20. The road determining section 46 determines a kind of the road 100 moved along by the vehicle 20, based on the road information acquired from the vehicle 20. The time slot determining section 48 determines a time slot during which the vehicle 20 has moved along the road 100, based on the time information acquired from the vehicle 20. The analysis section 50 performs a certain analysis based on the image information acquired from the vehicle 20.

The recording section 60 records: various kinds of programs; and various kinds of information to be used in processing performed by the arithmetic section 40. Moreover, the recording section 60 records any of first through third tables 62-66 shown in FIGS. 2-4.

The network communication section 34 transmits to the vehicle communication device 28 via the public line 102 information generated by the arithmetic section 40 or information recorded in the recording section 60, and, moreover, receives information transmitted via the public line 102 from the vehicle communication device 28, and outputs the received information to the arithmetic section 40 or the recording section 60.

[1.1.3. First Through Third Tables]

The first table 62 shown in FIG. 2 defines association of the kind of the road 100 (a first road, a second road) and the kind of the vehicle 20 (a first vehicle, a second vehicle) which are closely related to each other. In the first table 62, the kind of the road 100 is classified into the first road and the second road from a viewpoint of whether the road 100 is wide or narrow. For example, the road 100 whose width is less than a certain threshold is assumed to be the first road, and the road 100 whose width is the certain threshold or more is assumed to be the second road. Alternatively, the road 100 not having a median strip may be assumed to be the first road, and the road 100 having the median strip may be assumed to be the second road. Alternatively, the road 100 where a maximum speed (a speed limit) is a first speed may be assumed to be the first road, and the road 100 where the maximum speed is a second speed (>the first speed) may be assumed to be the second road. Moreover, in the first table 62, the kind of the vehicle 20 is classified from a viewpoint of whether the number of wheels of the vehicle 20 is large or small. For example, the two-wheeled vehicle 20 is assumed to be the first vehicle, and the four or more-wheeled vehicle 20 is assumed to be the second vehicle. The first table 62 associates the narrow road 100 as the first road and the two-wheeled vehicle 20 as the first vehicle, and associates the wide road 100 as the second road and the four or more-wheeled vehicle 20 as the second vehicle.

The second table 64 shown in FIG. 3 defines association of the time slot (a first time slot, a second time slot) and the kind of the vehicle 20 (the first vehicle, the second vehicle) which are closely related to each other. In the second table 64, the time slot is classified from a viewpoint of whether it is daytime or nighttime. For example, a specific time slot including 12 noon (7:00-19:00) is assumed to be the first time slot, and a specific time slot including 12 midnight (19:00-7:00) is assumed to be the second time slot. Note that times of sunrise and sunset may be acquired from public information, and information of the time slot updated as required. Moreover, in the second table 64, the kind of the vehicle 20 is classified into the first vehicle and the second vehicle from a viewpoint of whether the vehicle 20 is a private vehicle 20 or a commercial vehicle 20. For example, a private vehicle is assumed to be the first vehicle, and a commercial vehicle is assumed to be the second vehicle. The commercial vehicle referred to here includes a freight transporting vehicle such as a truck, and a passenger transporting vehicle such as a taxi or bus. The second table 64 associates daytime as the first time slot and the private vehicle as the first vehicle, and associates nighttime as the second time slot and the commercial vehicle as the second vehicle.

The third table 66 shown in FIG. 4 is a combination of the first table 62 and the second table 64, and defines association of the kind of the road 100 (the first road, the second road), the time slot (the first time slot, the second time slot), and the kind of the vehicle 20 (a third vehicle, a fourth vehicle, a fifth vehicle, a sixth vehicle). The third table 66 associates the narrow road 100 as the first road, daytime as the first time slot, and a bicycle as the third vehicle, and associates the narrow road 100 as the first road, nighttime as the second time slot, and a motorcycle as the fourth vehicle. Moreover, the third table 66 associates the wide road 100 as the second road, daytime as the first time slot, and the private vehicle as the fifth vehicle, and associates the wide road 100 as the second road, nighttime as the second time slot, and the commercial vehicle as the sixth vehicle.

1.2. Processing

Processing performed by the road management device 30 will be described using FIG. 5. The processing described below is performed every certain time.

The vehicle 20 periodically transmits to the road management device 30 the image information, the behavior information, the position information, the road information, the time information, and the vehicle information. In the road management device 30, the following processing is performed. Note that hereafter, an embodiment in which the analysis section 50 uses the image information to perform analytical processing of the road 100, will be described. However, the analysis section 50 can also perform the analytical processing of the road 100 using the behavior information.

In step S1, the control section 42 determines whether the road management device 30 has received information transmitted from any vehicle 20, or not. If the road management device 30 has received information (step S1: YES), then processing shifts to step S2. On the other hand, if the road management device 30 has not received information (step S1: NO), then processing ends for the moment.

In step S2, the control section 42 determines whether the received information satisfies a condition, or not. Here, the control section 42 determines whether the condition is satisfied or not, depending on whether the received information agrees with association of the table, or not. Details of determination processing performed here will be described in [1.3.] below. If the information satisfies the condition (step S2: YES), then processing shifts to step S4. On the other hand, if the information does not satisfy the condition (step S2: NO), then processing shifts to step S3.

In step S3, the control section 42 determines whether the number of items of information has reached a certain number of items or more, or not. Details of determination processing performed here will be described in [1.4.] below. If the number of items of information has reached the certain number of items or more (step S3: YES), then processing shifts to step S4. On the other hand, if the number of items of information is less than the certain number of items (step S3: NO), then processing ends for the moment.

In step S4, the analysis section 50 performs image recognition based on the image information included in the received information, and performs a certain analytical processing. For example, the analysis section 50 performs infrastructure analysis of whether a road surface has a hole, an obstacle, or a crack therein, or not, and whether a structure has damage therein, or not. Moreover, the analysis section 50 can also perform analysis of a congestion level of a sidewalk, for example, a traffic quantity or queue (for example, a queue for a roadside store) of the sidewalk, and so on.

1.3. Determination Processing

Details of the processing performed in step S2 of FIG. 5 will be described. The control section 42 uses any of the first through third tables 62-66 to determine whether the received information satisfies the condition for information fit for analysis, or not. Note that any of the first through third tables 62-66 is predetermined as the table used.

[1.3.1. Determination Processing Using First Table 62]

The moving body determining section 44 determines the kind of the vehicle 20, here, either the two-wheeled vehicle 20 (the first vehicle) or the four or more-wheeled vehicle 20 (the second vehicle), based on the received vehicle information. The road determining section 46 determines the kind of the road 100 moved along by the vehicle 20, here, either the narrow road 100 (the first road) or the wide road 100 (the second road), based on the received road information. The control section 42 performs either one of the following first processing or second processing, using a determination result by the moving body determining section 44 and a determination result by the road determining section 46.

Moreover, due to this processing, the control section 42 (the arithmetic section 40) can preferentially use information acquired from a certain kind of the vehicle 20 over information acquired from other kinds of the vehicle 20 in the certain analysis on a certain kind of the road 100. That is, the control section 42 (the arithmetic section 40) can perform the certain analysis on a first road of a first kind preferentially using first information acquired by a first moving body of a first kind, and perform the certain analysis on a second road of a second kind preferentially using second information acquired by a second moving body of a second kind.

In the first processing, the control section 42 uses the first table 62 to decide the kind of the road 100 associated with the kind of the vehicle 20 determined by the moving body determining section 44. Next, the control section 42 determines whether the decided kind of the road 100 and the kind of the road 100 determined by the road determining section 46 match, or not. If the kinds of the road 100 match, then the control section 42 determines that the received information satisfies the condition for information fit for analysis. On the other hand, if the kinds of the road 100 do not match, then the control section 42 determines that the received information does not satisfy the condition for information fit for analysis.

In the second processing, the control section 42 uses the first table 62 to decide the kind of the vehicle 20 associated with the kind of the road 100 determined by the road determining section 46. Next, the control section 42 determines whether the decided kind of the vehicle 20 and the kind of the vehicle 20 determined by the moving body determining section 44 match, or not. If the kinds of the vehicle 20 match, then the control section 42 determines that the received information satisfies the condition for information fit for analysis. On the other hand, if the kinds of the vehicle 20 do not match, then the control section 42 determines that the received information does not satisfy the condition for information fit for analysis.

[1.3.2. Determination Processing Using Second Table 64]

The moving body determining section 44 determines the kind of the vehicle 20, here, either the private vehicle (the first vehicle) or the commercial vehicle (the second vehicle), based on the received vehicle information. The time slot determining section 48 determines the time slot during which the vehicle 20 has moved, here, either daytime (the first time slot) or nighttime (the second time slot), based on the received time information. The control section 42 performs either of the following first processing or second processing, using a determination result by the moving body determining section 44 and a determination result by the time slot determining section 48.

Moreover, due to this processing, the control section 42 (the arithmetic section 40) can preferentially use information acquired from a certain kind of the vehicle 20 over information acquired from other kinds of the vehicle 20 in the certain analysis on the road 100 in a certain time slot. That is, the control section 42 (the arithmetic section 40) can perform the certain analysis on the road 100 in a first time slot preferentially using first information acquired by a first moving body of a first kind, and perform the certain analysis on the road 100 in a second time slot preferentially using second information acquired by a second moving body of a second kind.

In the first processing, the control section 42 uses the second table 64 to decide the time slot associated with the kind of the vehicle 20 determined by the moving body determining section 44. Next, the control section 42 determines whether the time slot determined by the time slot determining section 48 is included in the decided time slot, or not. If the time slot determined by the time slot determining section 48 is included in the decided time slot, then the control section 42 determines that the received information satisfies the condition for information fit for analysis. On the other hand, if the time slot determined by the time slot determining section 48 is not included in the decided time slot, then the control section 42 determines that the received information does not satisfy the condition for information fit for analysis.

In the second processing, the control section 42 uses the second table 64 to decide the kind of the vehicle 20 associated with the time slot determined by the time slot determining section 48. Next, the control section 42 determines whether the decided kind of the vehicle 20 and the kind of the vehicle 20 determined by the moving body determining section 44 match, or not. If the kinds of the vehicle 20 match, then the control section 42 determines that the received information satisfies the condition for information fit for analysis. On the other hand, if the kinds of the vehicle 20 do not match, then the control section 42 determines that the received information does not satisfy the condition for information fit for analysis.

[1.3.3. Determination Processing Using Third Table 66]

The moving body determining section 44 determines the kind of the vehicle 20, here, any of the bicycle (the third vehicle), the motorcycle (the fourth vehicle), the private vehicle (the fifth vehicle), or the commercial vehicle (the sixth vehicle), based on the received vehicle information. The road determining section 46 determines the kind of the road 100 moved along by the vehicle 20, here, either the narrow road 100 (the first road) or the wide road 100 (the second road), based on the received road information. The time slot determining section 48 determines the time slot during which the vehicle 20 has moved, here, either daytime (the first time slot) or nighttime (the second time slot), based on the received time information. The control section 42 performs either of the following first processing or second processing, using a determination result by the moving body determining section 44, a determination result by the road determining section 46, and a determination result by the time slot determining section 48.

Moreover, due to this processing, the control section 42 (the arithmetic section 40) can preferentially use information acquired from a certain kind of the vehicle 20 over information acquired from other kinds of the vehicle 20 in the certain analysis on a certain kind of the road 100 in a certain time slot. That is, the control section 42 (the arithmetic section 40) can perform the certain analysis on a first road of a first kind in a first time slot preferentially using third information acquired by a third moving body of a third kind, perform the certain analysis on the first road of the first kind in a second time slot preferentially using fourth information acquired by a fourth moving body of a fourth kind, perform the certain analysis on a second road of a second kind in the first time slot preferentially using fifth information acquired by a fifth moving body of a fifth kind, and perform the certain analysis on the second road of the second kind in the second time slot preferentially using sixth information acquired by a sixth moving body of a sixth kind.

In the first processing, the control section 42 uses the third table 66 to decide the kind of the road 100 and the time slot associated with the kind of the vehicle 20 determined by the moving body determining section 44. Next, the control section 42 determines whether the decided kind of the road 100 and the kind of the road 100 determined by the road determining section 46 match, or not. In addition, the control section 42 determines whether the time slot determined by the time slot determining section 48 is included in the decided time slot, or not. If the kinds of the road 100 match, and the time slot determined by the time slot determining section 48 is included in the decided time slot, then the control section 42 determines that the received information satisfies the condition for information fit for analysis. On the other hand, if the kinds of the road 100 do not match, or the time slot determined by the time slot determining section 48 is not included in the decided time slot, then the control section 42 determines that the received information does not satisfy the condition for information fit for analysis.

In the second processing, the control section 42 uses the third table 66 to decide the kind of the vehicle 20 associated with the kind of the road 100 determined by the road determining section 46 and the time slot determined by the time slot determining section 48. Next, the control section 42 determines whether the decided kind of the vehicle 20 and the kind of the vehicle 20 determined by the moving body determining section 44 match, or not. If the kinds of the vehicle 20 match, then the control section 42 determines that the received information satisfies the condition for information fit for analysis. On the other hand, if the kinds of the vehicle 20 do not match, then the control section 42 determines that the received information does not satisfy the condition for information fit for analysis.

1.4. Determination Processing

Details of the processing performed in step S3 of FIG. 5 will be described. If the received information does not satisfy the condition for information fit for analysis, then the control section 42 classifies that information based on a combination of the road information, the vehicle information, and the time information included in the information, and counts the number of items of the classified information.

The case of the first table 62 being used in the processing of step S2, will be assumed as a separate specific example. If the received information includes the road information of being the narrow road 100 (the first road) and the vehicle information of being the four or more-wheeled vehicle 20 (the second vehicle), then the control section 42 determines the received information to be first classification information, and counts the number of items of the first classification information. If the received information includes the road information of being the wide road 100 (the second road) and the vehicle information of being the two-wheeled vehicle 20 (the first vehicle), then the control section 42 determines the received information to be second classification information, and counts the number of items of the second classification information.

The case of the second table 64 being used in the processing of step S2, will be assumed as a specific example. If the received information includes the time information of being daytime (the first time slot) and the vehicle information of being the commercial vehicle (the second vehicle), then the control section 42 determines the received information to be first classification information, and counts the number of items of the first classification information. If the received information includes the time information of being nighttime (the second time slot) and the vehicle information of being the private vehicle (the first vehicle), then the control section 42 determines the received information to be second classification information, and counts the number of items of the second classification information.

Classification and counting of the number of items is similarly performed also in the case of the third table 66 being used in the processing of step S2.

1.5. Modified Example

Figure 5:
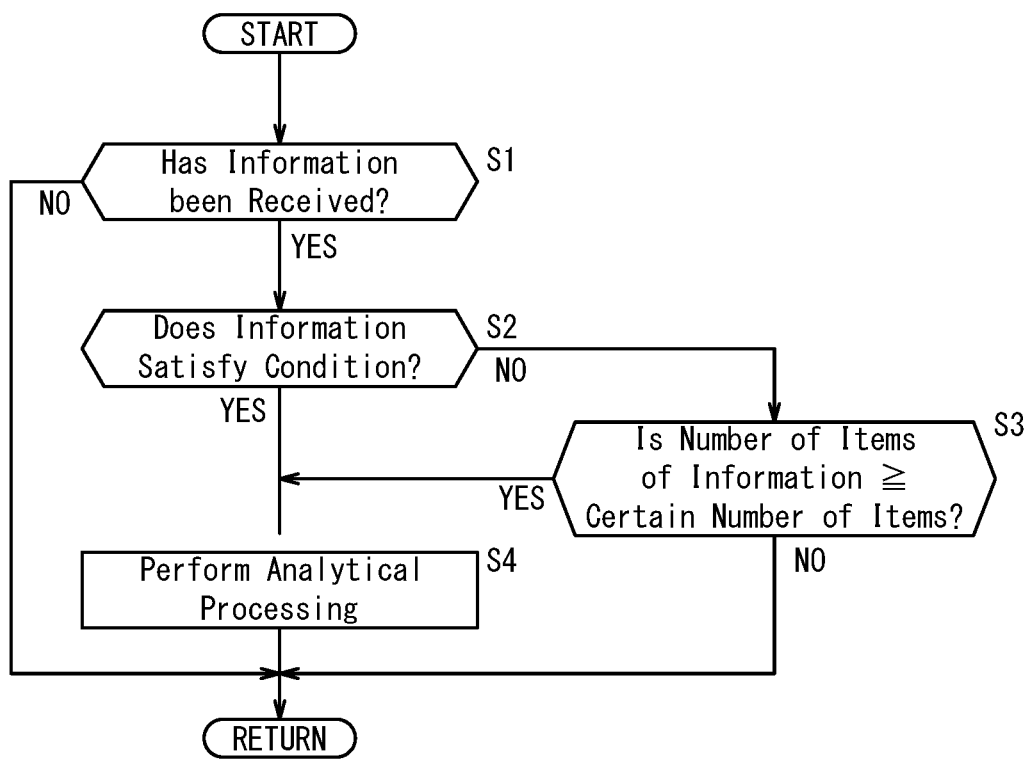
FIG. 5 is a flowchart of processing performed by a road management device in the first embodiment.

In the processing shown in FIG. 5, if the received information is determined to satisfy the condition (step S2: YES), then the analysis section 50 performs a sequential analysis (step S4). Instead, a configuration may be adopted whereby information satisfying the condition is accumulated in the recording section 60, and the analysis section 50 performs analytical processing periodically.

The processing of step S3 shown in FIG. 5 may be omitted, and processing ended for the moment.

2. Second Embodiment

2.1. Configuration

Figure 6:
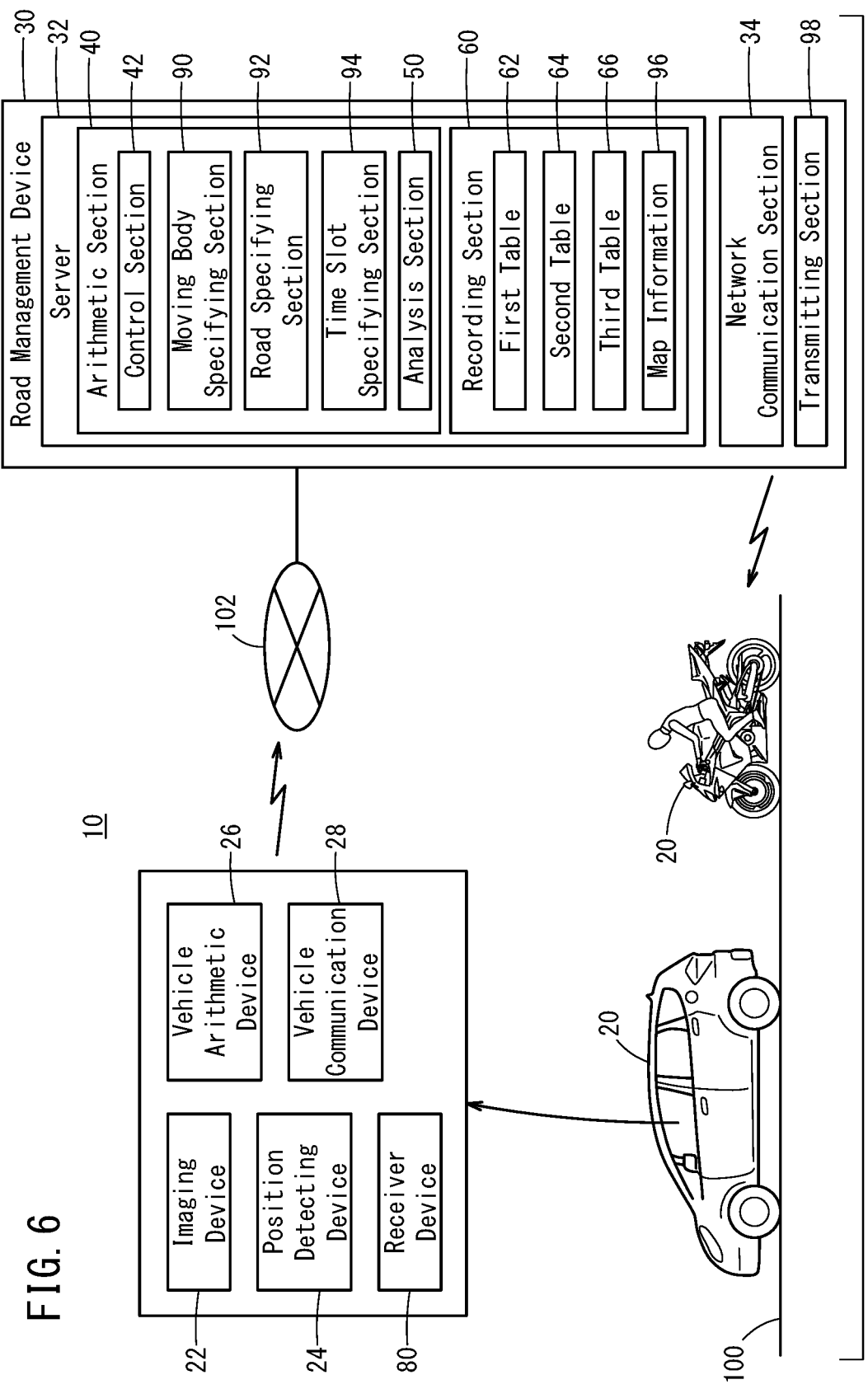
FIG. 6 is a configuration diagram of a road management system according to a second embodiment.

A configuration of a road management system 10 according to a second embodiment will be described using FIG. 6. Configurations of the road management system 10 according to the second embodiment that are the same as those of the road management system 10 according to the first embodiment will be assigned with the same symbols as in the first embodiment.

In the second embodiment, the road management device 30 includes a transmitting section 98 by which information is transmitted to a wide area, or is transmitted to a roadside unit provided to the road 100. Moreover, the vehicle 20 includes a receiver device 80 that receives broadcasted information.

In the second embodiment, the arithmetic section 40 of the road management device 30 functions as the control section 42, a moving body specifying section 90, a road specifying section 92, a time slot specifying section 94, and the analysis section 50. The moving body specifying section 90 specifies the kind of the vehicle 20 acquiring the image. The road specifying section 92 specifies the kind of the road 100 being an analysis target. The time slot specifying section 94 specifies the time slot being an analysis target. The recording section 60 of the road management device 30 records map information 96.

2.2. Processing

Figure 7:
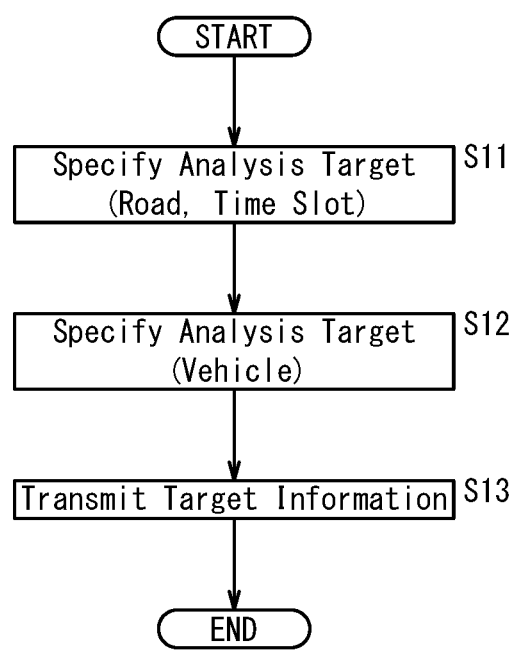
FIG. 7 is a flowchart of processing performed by a road management device in the second embodiment.

First, processing performed by the road management device 30 will be described using FIG. 7.

In step S11, at least one of the road specifying section 92 and the time slot specifying section 94 specifies an analysis target. As an example, a user (for example, a road administrator) uses an input device to designate to the road management device 30 at least one of a position of the road 100 and a time slot on which analysis is wanted to be performed. In this case, the road specifying section 92 specifies the kind of the road 100 at the designated position, based on the map information 96. Moreover, the time slot specifying section 94 specifies the inputted time slot as an analysis target time slot.

In step S12, the moving body specifying section 90 specifies the vehicle 20 assumed to be an analysis target. For example, the moving body specifying section 90 checks the kind of the road 100 specified by the road specifying section 92 against the first table 62 shown in FIG. 2, and specifies the kind of the vehicle 20. Alternatively, the moving body specifying section 90 checks the time slot specified by the time slot specifying section 94 against the second table 64 shown in FIG. 3, and specifies the kind of the vehicle 20. Alternatively, the moving body specifying section 90 checks the kind of the road 100 specified by the road specifying section 92 and the time slot specified by the time slot specifying section 94 against the third table 66 shown in FIG. 4, and specifies the kind of the vehicle 20. The table used here is decided according to the analysis target specified in step S11.

In step S13, the control section 42 generates request information by associating: at least one of information indicating the kind of the road 100 and information indicating the time slot specified in step S11; designation information designating the kind of the vehicle 20 specified in step S12; and a request signal requesting transmission of the image information. Then, the control section 42 controls the transmitting section 98 to transmit the generated request information. Then, due to the above kind of processing in the road management device 30 and later-mentioned processing of the vehicle 20, the control section 42 (the arithmetic section 40) can perform any of (1)-(3) below.

(1) Case of Using First Table 62:

The control section 42 (the arithmetic section 40) can preferentially use information acquired from a certain kind of the vehicle 20 over information acquired from other kinds of the vehicle 20 in the certain analysis on a certain kind of the road 100. That is, the control section 42 (the arithmetic section 40) can perform the certain analysis on a first road of a first kind preferentially using first information acquired by a first moving body of a first kind, and perform the certain analysis on a second road of a second kind preferentially using second information acquired by a second moving body of a second kind.

(2) Case of Using Second Table 64:

The control section 42 (the arithmetic section 40) can preferentially use information acquired from a certain kind of the vehicle 20 over information acquired from other kinds of the vehicle 20 in the certain analysis on the road 100 in a certain time slot. That is, the control section 42 (the arithmetic section 40) can perform the certain analysis on the road 100 in a first time slot preferentially using first information acquired by a first moving body of a first kind, and perform the certain analysis on the road 100 in a second time slot preferentially using second information acquired by a second moving body of a second kind.

(3) Case of Using Third Table 66:

The control section 42 (the arithmetic section 40) can preferentially use information acquired from a certain kind of the vehicle 20 over information acquired from other kinds of the vehicle 20 in the certain analysis on a certain kind of the road 100 in a certain time slot. That is, the control section 42 (the arithmetic section 40) can perform the certain analysis on a first road of a first kind in a first time slot preferentially using third information acquired by a third moving body of a third kind, perform the certain analysis on the first road of the first kind in a second time slot preferentially using fourth information acquired by a fourth moving body of a fourth kind, perform the certain analysis on a second road of a second kind in the first time slot preferentially using fifth information acquired by a fifth moving body of a fifth kind, and perform the certain analysis on the second road of the second kind in the second time slot preferentially using sixth information acquired by a sixth moving body of a sixth kind.

Figure 8:
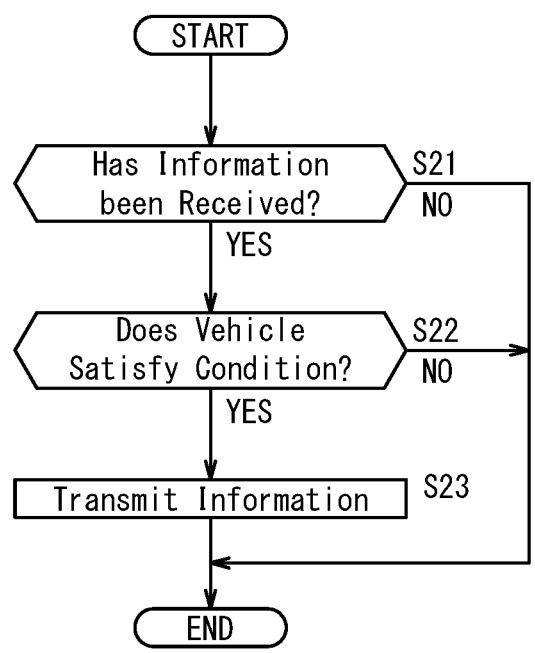
FIG. 8 is a flowchart of processing performed by a vehicle in the second embodiment.

Next, processing performed by the vehicle 20 will be described using FIG. 8.

In step S21, the vehicle arithmetic device 26 determines whether the receiver device 80 has received the request information, or not. If the receiver device 80 has received the request information (step S21: YES), then processing shifts to step S22. On the other hand, if the receiver device 80 has not received the request information (step S21: NO), then processing ends for the moment.

In step S22, the vehicle arithmetic device 26 determines whether the vehicle 20 satisfies a condition based on each of information included in the request information, or not. The vehicle arithmetic device 26 checks the designation information (the information designating the kind of the vehicle 20) included in the request information against the vehicle information recorded in the vehicle arithmetic device 26. Then, if both match, the vehicle arithmetic device 26 determines a vehicle condition to be satisfied. Moreover, the vehicle arithmetic device 26 checks the information of the kind of the road 100 included in the request information against the road information specified by the position detecting device 24. Then, if both match, the vehicle arithmetic device 26 determines a road condition to be satisfied. In addition, the vehicle arithmetic device 26 checks the information of the time slot included in the request information against the system time. Then, if the time slot included in the request information includes the system time, the vehicle arithmetic device 26 determines a time condition to be satisfied. If the vehicle arithmetic device 26 determines that all of the information included in the request information satisfies conditions (step S22: YES), then processing shifts to step S23. On the other hand, if the vehicle arithmetic device 26 determines that any of the information included in the request information does not satisfy a condition (step S22: NO), then processing ends.

In step S23, the vehicle arithmetic device 26 determines the vehicle 20 to be a target fit to transmit information (here, the image information). The vehicle arithmetic device 26 controls the imaging device 22 to image the road surface. The vehicle arithmetic device 26 controls the vehicle communication device 28 to transmit the image information acquired by imaging.

Due to the above processing, the arithmetic section 40 (the analysis section 50) of the road management device 30 can perform user-designated analysis of the road 100.

3. Technical Ideas Obtained from Embodiments

Technical ideas understandable from the above-described embodiments will be described below.

An aspect of the present invention is a road management device 30 comprising an arithmetic section 40, the arithmetic section 40 performing a certain analysis on a road 100 using information acquired by a moving body (a vehicle 20) moving along the road 100, the arithmetic section 40 performing the certain analysis on the road 100 in a first time slot using first information acquired by a first moving body of a first kind, and performing the certain analysis on the road 100 in a second time slot using second information acquired by a second moving body of a second kind.

Due to the above-described configuration, the kind of the moving body (the vehicle 20) fit to acquire information is specified according to the time slot, hence the information to be used in analysis of the road 100 can be appropriately selected. At this time, the time slot and the kind of the moving body (the vehicle 20) that are closely related to each other are associated in advance, thereby enabling the information to be used in analysis of the road 100 to be more appropriately selected.

In an aspect of the present invention,
a targeted time slot during which the arithmetic section 40 performs the certain analysis may be associated with a kind of the moving body (the vehicle 20) acquiring the information (first information, second information).

In an aspect of the present invention,
the first time slot may be daytime, and
the second time slot may be nighttime.

In an aspect of the present invention,
the first moving body may be a private vehicle, and
the second moving body may be a commercial vehicle.

In an aspect of the present invention,
the arithmetic section 40 may comprise:
a moving body determining section 44 that determines a kind of the moving body (the vehicle 20) based on the information acquired from the moving body (the vehicle 20);
a time slot determining section 48 that determines a time slot during which the moving body (the vehicle 20) has moved along the road 100 based on the information acquired from the moving body (the vehicle 20); and
an analysis section 50 that performs the certain analysis based on a determination result of the moving body determining section 44 and a determination result of the time slot determining section 48.

In an aspect of the present invention,
the road management device 30 may comprise a recording section 60 that records the moving body (the vehicle 20) of a certain kind in an associated manner, for each of a plurality of time slots, and
in the case where a kind of the moving body (the vehicle 20) decided based on a record of the recording section 60 matches a kind of the moving body (the vehicle 20) determined by the moving body determining section 44, the analysis section 50 may perform the certain analysis on the time slot determined by the time slot determining section 48, using the information acquired from said moving body (vehicle 20).

In an aspect of the present invention,
the road management device 30 may comprise a recording section 60 that records the time slot in an associated manner, for each of a plurality of kinds of the moving bodies (the vehicles 20), and
in the case where the time slot decided based on a record of the recording section 60 matches the time slot determined by the time slot determining section 48, the analysis section 50 may perform the certain analysis on a kind of the moving body (the vehicle 20) determined by the moving body determining section 44, using the information acquired from said moving body (vehicle 20).

In an aspect of the present invention,
the road management device 30 may comprise a transmitting section 98 that transmits to the moving body (the vehicle 20) designation information designating a specific kind of the moving body (the vehicle 20) and a request signal requesting transmission of the information.

Due to the above-described configuration, information (image information) of the road 100 closely related to the moving body (the vehicle 20) can be collected by designating the moving body (the vehicle 20).

In an aspect of the present invention,
the road management device 30 may comprise a recording section 60 that records the moving body (the vehicle 20) of a certain kind in an associated manner, for each of a plurality of time slots, and
the arithmetic section 40 may perform: a processing specifying during which time slot the certain analysis is to be performed on the road 100; and a processing in which the moving body (the vehicle 20) of a kind associated with said time slot is designated as the moving body (the vehicle 20) of a specific kind, based on a record of the recording section 60.

Due to the above-described configuration, the time slot during which analysis is to be performed is specified in advance, hence analysis of the road 100 in a desired time slot can be performed.

Note that the road management device according to the present invention is not limited to the above-mentioned embodiments, and that, of course, a variety of configurations may be adopted without departing from the spirit of the present invention.

What is claimed is:

1. A road management device comprising:
   an arithmetic section, the arithmetic section performing a certain analysis on a road using information acquired from a moving body moving along the road; and
   a recording section, the recording section recording, as a condition for performing the certain analysis, kinds of moving bodies and time slots during which the moving bodies move along the road in association with each other,
   wherein the information includes, in an associated manner, image information indicating an image of a periphery of the moving body taken with a camera installed in the moving body, time information indicating a time at which the image is taken and vehicle information indicating a kind of the moving body,
   the arithmetic section comprises:
      a moving body determining section configured to determine the kind of the moving body on a basis of the vehicle information included in the information;
      a time slot determining section configured to determine a time slot during which the moving body moves along the road on a basis of the time information included in the information;
      a control section configured to determine whether a combination of a determination result by the moving body determining section and a determination result by the time slot determining section matches the condition for performing the certain analysis; and
      an analysis section configured to perform the certain analysis using the image information included in the information on a basis of a determination result by the control section that the combination matches the condition for performing the certain analysis, wherein
      the certain analysis includes image recognition based on the image information, and
      the analysis section performs at least one of analytical processing for determining whether a road surface has a hole, an obstacle, or a crack therein, analytical processing for determining a structure has damage therein, and analytical processing for determining a congestion level of a sidewalk.

2. The road management device according to claim 1, wherein
   the recording section records a first time slot associated with a private vehicle, the first time slot including 12 noon, and
   the a second time slot is nighttime associated with a commercial vehicle, the second time slot including 12 midnight and excluding the first time slot.

3. The road management device according to claim 1, wherein, in the case where the kind of the moving body decided based on a record of the recording section as being associated with the time slot determined by the time slot determining section matches the kind of the moving body determined by the moving body determining section, the control section determines that the condition for performing the certain analysis is satisfied.

4. The road management device according to claim 1, wherein, in the case where the time slot decided based on a record of the recording section as being associated with the moving body determined by the moving body determining section matches the time slot determined by the time slot determining section, the control section determines that the condition for performing the certain analysis is satisfied.

5. A road management device, comprising:
   an arithmetic section, the arithmetic section performing a certain analysis on a road using information acquired from a moving body moving along the road; and
   a recording section, the recording section recording kinds of moving bodies and time slots during which the moving bodies move along the road that are associated with each other, wherein the information includes image information indicating an image of a periphery of the moving body taken with a camera installed in the moving body,
   the arithmetic section comprises:
      a time slot specifying section that specifies a time slot designated by a user through an input device;
      a moving body specifying section that specifies a kind of moving body recorded in the recording section in association with the time slot specified by the time slot specifying section;
      a control section that generates request information by associating the time slot specified by the time slot specifying section, the kind of moving body specified by the moving body specifying section, and a request signal requesting transmission of the information;
      a transmitting section that transmits the request information externally;
      a communication section that receives the information transmitted from the moving body in response to the request information; and
      an analysis section that performs the certain analysis using the image information included in the information, wherein
      the certain analysis includes image recognition based on the image information, and the analysis section performs at least one of analytical processing for determining whether a road surface has a hole, an obstacle, or a crack therein, analytical processing for determining a structure has damage therein, and analytical processing for determining a congestion level of a sidewalk.

* * * * *